G. ANGER.
MACHINE FOR OILING TIN OR OTHER PLATES.
APPLICATION FILED MAY 28, 1913.

1,150,092.

Patented Aug. 17, 1915.
3 SHEETS—SHEET 1.

WITNESSES:
John C. Sanders
Albert F. Neuman

INVENTOR:
Gustav Anger
BY Wallace White
ATT'Y

G. ANGER.
MACHINE FOR OILING TIN OR OTHER PLATES.
APPLICATION FILED MAY 28, 1913.
1,150,092.
Patented Aug. 17, 1915.
3 SHEETS—SHEET 2.
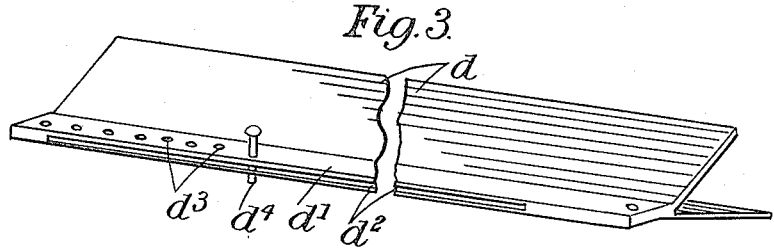
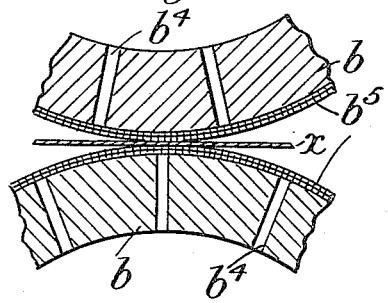
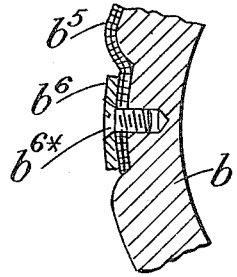
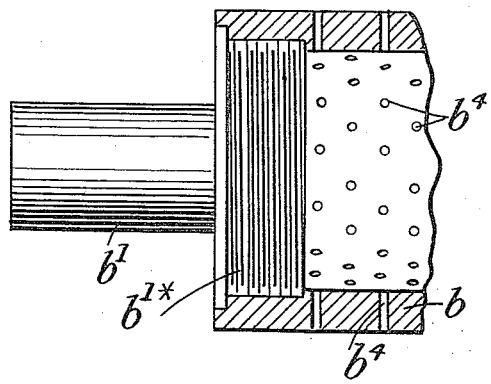
WITNESSES:
John C. Sanders
Albert F. Heuman
INVENTOR:
Gustav Anger
by Wm. Wallace White
ATTY

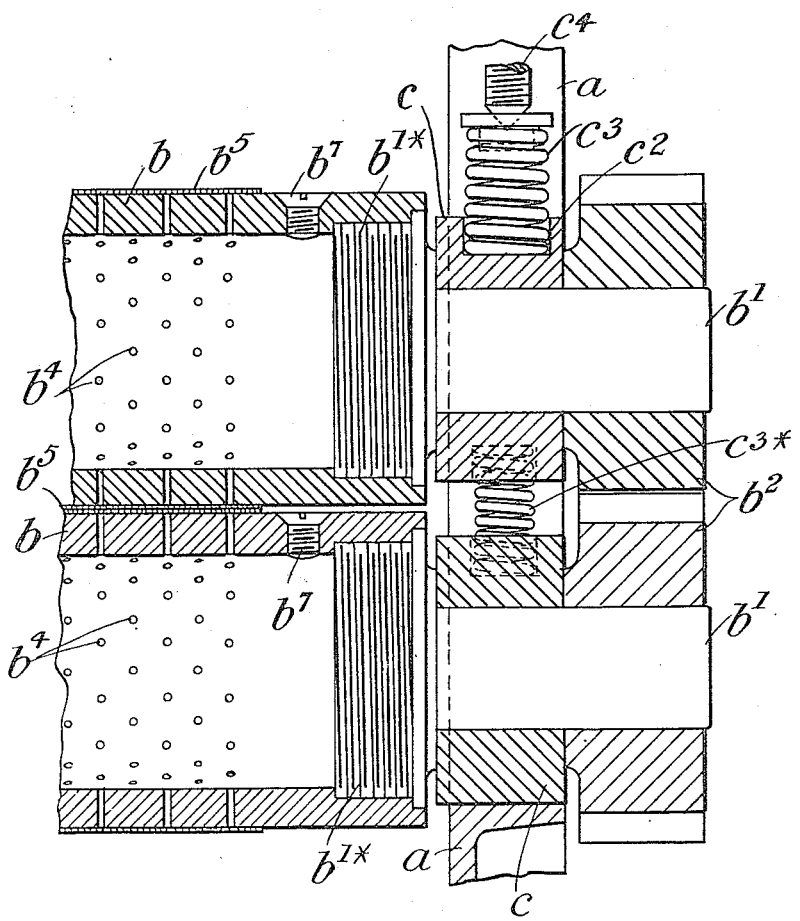

UNITED STATES PATENT OFFICE.

GUSTAV ANGER, OF LOWESTOFT, ENGLAND.

MACHINE FOR OILING TIN OR OTHER PLATES.

1,150,092.  Specification of Letters Patent.  Patented Aug. 17, 1915.

Application filed May 28, 1913. Serial No. 770,351.

*To all whom it may concern:*

Be it known that I, GUSTAV ANGER, a subject of the King of Great Britain, residing at 12 Windsor road, Lowestoft, in the county of Suffolk, England, factory manager, have invented certain new and useful Improvements in or connected with Machines for Oiling Tin or other Plates, of which the following is a specification, reference being had to the drawings hereunto annexed and to the figures and letters marked thereon—that is to say:

The invention relates to improvements in or connected with machines for oiling tin or other plates and more especially tin plates preparatory to their being pressed or stamped into boxes to be used in packing food such as fish. A device has previously been suggested for this purpose but it consisted of solid uncovered rollers which required to be oiled before the passage therethrough of each plate. This operation was laborious and the result obtained was not altogether satisfactory.

Now the primary object of the present invention is to obtain a simple and inexpensive machine which will obviate this disadvantage and only need to be charged before commencing the day's work and which at the same time will perform the necessary oiling in a more efficient manner than heretofore.

Figure 1:
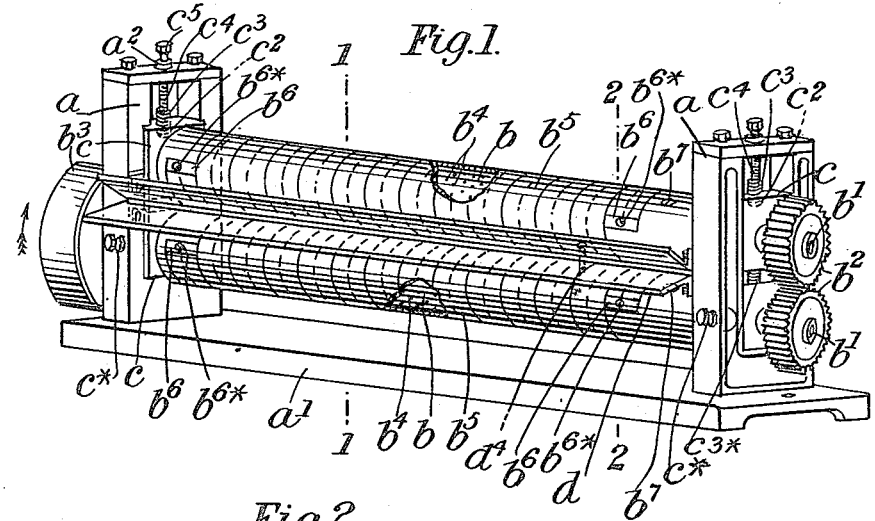
Figure 2:
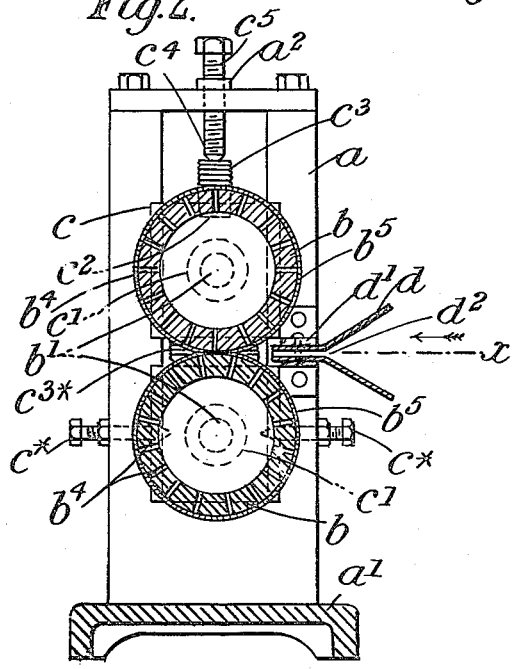

In the accompanying drawings:—Figure 1 is a perspective elevation of a machine constructed according to the present invention with parts of the covering of the rollers broken away. Fig. 2 is a vertical transverse section taken on the line 1—1 of Fig. 1. Fig. 3 is a perspective view of the guide for leading the plates to the rollers. Fig. 4 is a sectional view of portions of the rollers showing a plate passing therethrough. Fig. 5 is a part section taken on the line 2—2 of Fig. 1 and Fig. 6 is a sectional view of the end of one of the rollers showing the construction thereof. Fig. 7 is a detailed vertical sectional view of the ends of the rollers and their bearings.

In the several figures like parts are indicated by similar letters of reference and Fig. 6 is drawn to an increased scale, while Figs. 4 and 5 are drawn to a further increased scale with respect to the other figures of the drawings.

$a$ represents standards or frames carried by a bed plate $a'$ adapted to be fixed by screws to a table or bench and $b$ represents a pair of hollow rollers. The rollers $b$ are, at each end thereof, provided with short axles $b'$ formed with enlargements having screw threads $b'^*$ which screw into the correspondingly threaded ends of the rollers $b$ and the axles $b'$ are revolubly mounted in bearings $c'$ formed or provided in blocks $c$, the upper one of which is mounted with capability of sliding vertically within the frames or standards $a$ while the lower ones of the blocks $c$ are by means of set screws $c^*$ fixed in position in said frames.

In a recess $c^2$ in each of the upper blocks $c$ is a helical spring $c^3$ in the upper end of which is mounted a cup or ferrule $c^4$ in which seats the pointed end of a regulating screw $c^5$ screwing through a nut $a^2$ in the top of the frame or standard $a$ and by these means the top one of the rollers $b$ may be caused to bear with a spring pressure, capable of regulation by the screw $c^5$, upon the lower one of the rollers $b$. Springs $c^{3*}$ are arranged between the blocks $c$ in order to enable the upper one of the rollers $b$ to rise when the pressure of the regulating screw $c^5$ is relaxed or taken off so as to admit of very heavy plates being passed between the rollers $b$ or for other reasons.

The axles $b'$ at one end of the rollers $b$ are prolonged beyond their bearings $c'$ and have fixed thereon spur wheels $b^2$ which mesh with one another so that the rollers are caused to revolve in opposite directions and the teeth of these wheels are made of such depth as to admit of the approach of the upper one of the rollers $b$ to the lower one for the necessary regulation of the pressure by the screws $c^5$ or vice versa. At the opposite end of the machine the axle $b'$ of the lower roller $b$ is also prolonged and has fixed thereon a pulley $b^3$ adapted to receive a belt by means of which the rollers may be driven from any suitable source of power, or the rollers $b$ might be driven by any other suitable means.

Each of the rollers $b$ is perforated with closely spaced holes $b^4$ through which the oil can percolate and is provided with a filling orifice closed by a screw stopper $b^7$ through which the rollers may be charged with oil; one filling is generally sufficient for a day's work. Or the charging of the rollers might be accomplished in any other suitable way.

The rollers $b$ are covered for all or part of their length with a covering $b^5$ of any suitable textile or other material but preferably with imitation moleskin applied thereto in any suitable manner. The preferred method of application is to cut the imitation moleskin into a long strip and wind it around the roller in helical formation, as shown in the drawings, with the edges of adjacent convolutions closely abutting against one another. A second strip is then similarly wound over the first strip so as to cover the joints between the edges of the convolutions of the first strip by which means the oil is prevented from coming too freely to the surface of the covering. The ends of the strips $b^5$ are fastened to the rollers $b$ by means of clamping plates $b^6$ countersunk in recesses in the rollers and secured by screws $b^{6*}$ as shown more particularly at Fig. 5.

$d$ is a V shaped guide fixed to the standards or frames $a$ and having for its object to facilitate the introduction of the plates $x$ into the grip of the rollers $b$; it is formed with a flattened part $d'$ terminating in a long slot $d^2$ through which the plates are compelled to pass and which closely approaches the meeting point of the rollers $b$. The guide $d$ should be so arranged with relation to the rollers $b$ that the plate $x$ passing through the latter avoids the clamping plates $b^6$ as the recesses in which they lie might mark the plates, and for this purpose the guide $d$ is at one end provided with several perforations $d^3$ into one or other of which a peg $d^4$ is adapted to take in order to regulate the length of the slot $d^2$ and guide the plates in the correct manner.

In practice the oil finds its way through the perforations $b^4$ of the rollers $b$ and saturates the covering $b^5$ which in turn gives it off in the required quantity to the plates $x$ passing between the rollers.

By the means hereinbefore described a simple machine is obtained which is inexpensive to work inasmuch as the rollers only require charging at long intervals, while at the same time the oiling is more efficiently performed as it is more evenly distributed over the plates and that only in the exact quantity required so that an improved result is obtained and an economy effected in oil.

Having now particularly described and ascertained the nature of the said invention and in what manner the same is to be performed I declare that what I claim is:—

1. In a machine for oiling metal plates the combination of a pair of hollow perforated rollers covered with suitable absorbent material and having their bearings vertically movable in guides, countersunk means for securing said material to the rollers, springs for constantly pressing the rollers into contact with one another, means for facilitating the charging of the rollers with oil, a guide for conducting the plates into position between the rollers, said guide having divergent sides and a slotted portion disposed horizontally adjacent the bight of the rollers, and means for rotating the rollers in opposite directions so as to grip and carry forward the plates substantially as herein shown and described and for the purpose stated.

2. In a machine of the character referred to for oiling metal plates comprising hollow rollers perforated and covered with a suitable absorbent material said covering of each of the rollers consisting of a strip of the material wound around the roller in helical formation and a second strip wound over the first so as to break joint therewith said strips having their ends fastened to the roller substantially as herein shown and described and for the purpose stated.

In witness whereof I have hereunto set my hand in the presence of two witnesses.

GUSTAV ANGER.

Witnesses:
HARRY A. AMISS,
W. G. MAIKAND.